Sept. 10, 1935.  J. K. ROBERTS ET AL  2,013,992
STABILIZATION OF GASOLINE
Filed Aug. 1, 1931
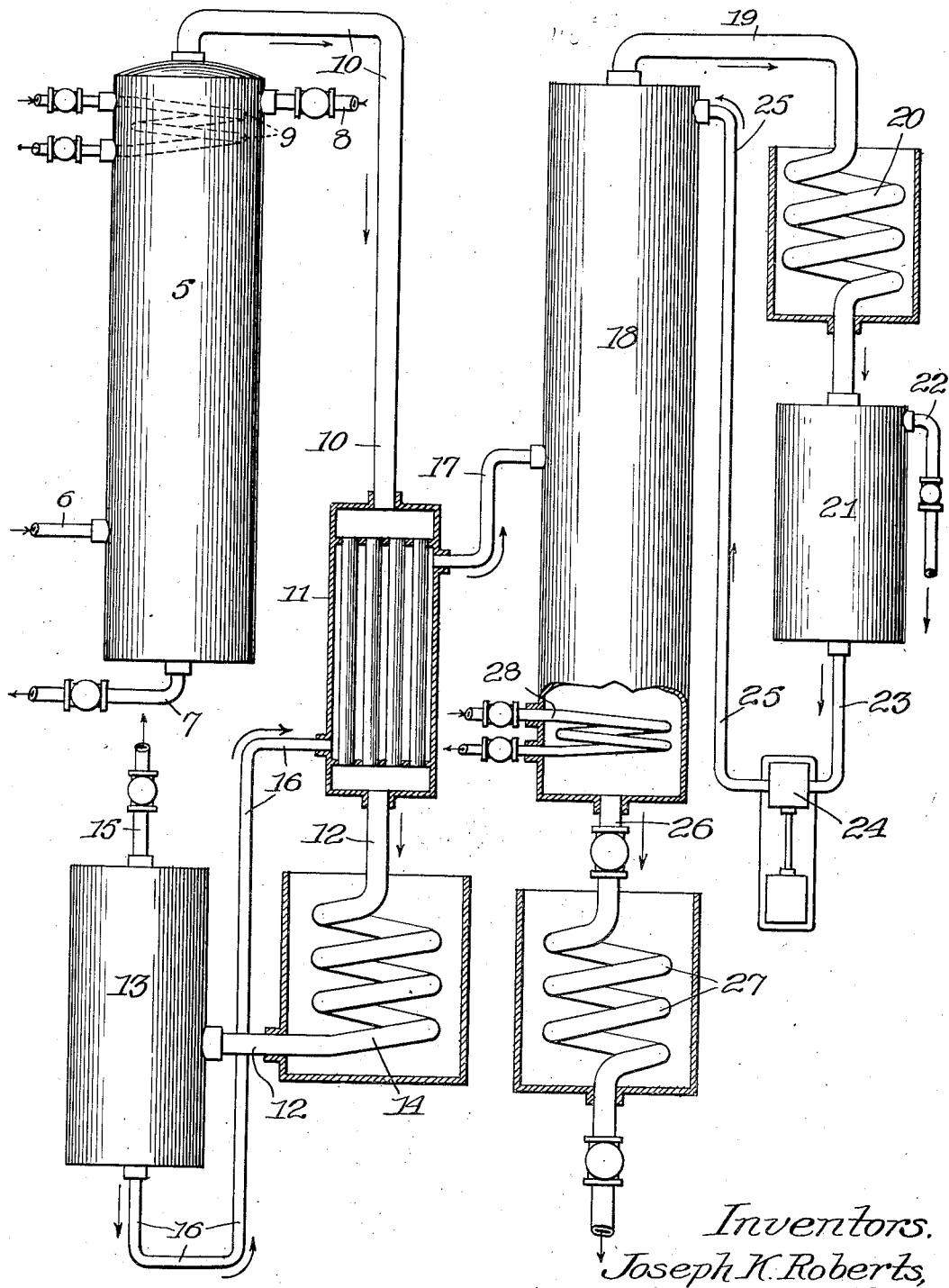
Inventors.
Joseph K. Roberts,
George W. Watts,
By Dyrenforth, Lee, Chritton & Wiles,
Attys.

Patented Sept. 10, 1935

2,013,992

UNITED STATES PATENT OFFICE 2,013,992

STABILIZATION OF GASOLINE

Joseph K. Roberts, Hammond, and George W. Watts, Whiting, Ind., assignors to Standard Oil Company, Whiting, Ind., a corporation of Indiana Application August 1, 1931, Serial No. 554,534

1 Claim. (Cl. 196—11)

This invention relates to the stabilization of light hydrocarbon oils, and particularly to the stabilization of low-boiling oils derived from higher boiling hydrocarbon oils under cracking conditions of pressure and temperature. The invention will be more fully understood by reference to the following description in conjunction with the accompanying drawing which is an elevational view, somewhat diagrammatic in character, of apparatus suitable for carrying out the process of the invention.

Referring to the drawing, the numeral 5 indicates a fractionating column which receives low boiling vapor products through a line 6 leading from a cracking process wherein higher boiling hydrocarbon oils are subjected to cracking. The vapors supplied to column 5 may comprise all vapor products given off by the oil undergoing cracking and may, under such conditions, contain some constituents of higher boiling point than those desired in the finished stabilized product, or the vapors fed to column 5 through line 6 may be vapors from which a substantial portion of the heavier constituents have been separated; for example, the vapors may have been passed through a suitable dephlegmator wherein a substantial portion of such heavier constituents are condensed out before they are passed to column 5. The column 5 is provided with a plurality of spaced fractionating elements (not shown) of any suitable type, for example, bubble-cap plates, screen plates, or ring and disk plates. The heated vapors discharged into column 5 are subjected to fractionation to remove therefrom, as condensate, the higher boiling constituents undesired in the final distillate product, such condensate being withdrawn from the lower end of the column through a valved line 7. The necessary cooling for fractionation may be effected by the introduction of a relatively cool fluid into the upper portion of the column through a valved line 8 and/or a cool fluid may be passed through a coil 9 mounted in the upper portion to effect condensation of a portion of the vapors which condensate functions as a reflux cooling medium.

The fractionated vapors, substantially free of heavy undesired constituents, are withdrawn from the top of column 5 through line 10 and pass to a heat exchanger 11 wherein they give up a substantial portion of their heat to oil passed in indirect heat exchange therethrough, as hereinafter set forth. The cooled vapors and any condensate are passed from the other end of heat exchanger 11 through a line 12 and into a separator-drum 13.

It is preferred to cool the vapors, before passing them to drum 13, to a point at which substantially all constituents thereof, desired in the final product, are condensed. If the vapors are not sufficiently cooled in the heat exchanger 11, additional cooling may be effected by means of a cooling coil 14 provided in line 12.

The condensed desired constituents and the gases and uncondensed vapors of excessively volatile constituents undesired in the final product, separate within the drum 13, the gases and uncondensed vapors being withdrawn through a valved line 15 and discharged from the system, and the condensate being withdrawn through line 16 and passed to the heat exchanger 11. The condensate is substantially heated within exchanger 11 by the already described hot vapors flowing thereto from column 5, and is withdrawn through line 17 and passed to a stabilizing column 18. The column 18 is maintained under a substantial superatmospheric pressure, preferably in excess of 75 lbs., and is provided internally with a plurality of spaced elements (not shown) for effecting intimate contact of vapors and liquids therein, for example, fractionating elements of a type similar to those employed in column 5, may be employed therein.

The heated oil discharged into the column 18 is subjected to rectification therein to remove therefrom substantially all of the excessively volatile constituents undesired in the final distillate product. The oil is introduced through line 17 into the column 18 at such a temperature that a portion of it separates as vapor within the column 18, the vaporized portion consisting in part of the undesired excessively volatile constituents and in part of lower boiling constituents desired in the final product. The vapors ascend through the column 18, and are fractionated therein, the uncondensed vapors passing out through a valved vapor line 19 to a condenser 20 wherein a portion of the vapors is condensed for reflux. The condensate together with the uncondensed excessively volatile vapors or gases is passed from condenser 20 to a separator 21 wherein the condensate and gases or vapors are separated, the latter being withdrawn therefrom, and from the system, through a valved line 22. The separated condensate is passed from the separator 21 through a line 23 to a pump 24 by which it is forced through a line 25 into the upper portion of the column 18 to serve as a downwardly flowing reflux cooling medium therein.

The unvaporized portion, from which substantially all of the undesired excessively volatile constituents have been removed, is withdrawn from the bottom of column 18, and from the system, through a valved line 26. The unvaporized portion may be passed from line 26 through a cooler 27. It is preferred to operate the column 18 so as to maintain a substantial body of such liquid portion in the bottom of the column 18 and supply heat to such liquid body to effect reboiling thereof. This reboiling may be accomplished by passing steam or other hot fluid through a coil 28 provided therein.

In a specific operation, vapors comprising constituents within the gasoline range of boiling points and containing some undesired excessively volatile products and some undesired higher boiling products, were supplied to column 5 through line 6. The column 5 was maintained under 200 lbs. pressure and sufficient cooling was effected therein to maintain a temperature of about 420° F., at the vapor outlet thereof. The condensed products were withdrawn from the bottom of the column through line 7 and consisted of substantially all the undesired higher boiling constituents of the original vapors. The vapors withdrawn from column 5 were cooled by the condensate from separator 13 to about 200° F., the vapors flowing through the exchanger 11 countercurrent to the flow of condensate therethrough. Additional cooling of products from column 5 was effected by means of the coil 14 so that they were cooled to about 85° F., before they were introduced into the separator 13. The condensate withdrawn from separator 13 was heated to about 350° F. in the heat exchanger 11 by the already described vapors passing therethrough from column 5. The column 18 was maintained under substantially the same pressure as that in the column 5 less, of course, any differential required to effect a substantial flow through the system. Under such pressure conditions, the top of the column 18 was maintained at about 110° F., and the bottom was maintained at about 370° F. The finished product withdrawn through line 26 constituted a stabilized pressure distillate substantially free of undesired excessively volatile, and undesired higher boiling constituents. The uncondensed vapors or gases withdrawn from separators 13 and 21, through lines 15 and 22, respectively, consisted of substantially all the excessively volatile constituents undesired in the final stabilized distillate product, and contained substantially none of the most volatile constituents desired in the final distillate product.

In accordance with the present invention, the heat and pressure of vapors from a pressure cracking operation are employed for the substantially complete stabilization of such vapors.

While the above description indicates that we may employ substantially the same pressure in our stabilization process and apparatus as that employed in the fractionator or dephlegmator of the cracking system from which our process and apparatus receives the stock to be treated, it is to be understood that we may employ higher or lower pressures in all, or any part of our system. For example, a pump (not shown) may be interposed in line 16 whereby the column 18 may be operated at a pressure higher than that in column 5, or the cracking system, and/or one or more suitable pressure reducing valves may be employed in the system to reduce the pressure in any one or more of the stages thereof. It will be seen that the amount of heating of condensate from separator 13 and/or cooling of vapor from column 5 may be varied by employing a heat-exchanger which provides for a longer or shorter counter-current flow, therethrough, of such products. Also, it will be understood that some extraneous heat may be employed in various parts of the system in addition to that furnished by the vapor from the pressure distillation process. For example, the lower portion of column 18 may be supplied with additional heat to effect reboiling of liquid condensate within the column 18.

It is to be understood that the specific details of apparatus and method hereinbefore set forth are for the purpose of illustration, and are not intended to be regarded as limitations upon the scope of the invention, except as contained in the following claim.

We claim:

The method of stabilizing hot vapors which comprises partially cooling said hot vapors in a first cooling zone to effect condensation and separation of substantially all of the constituents heavier than those desired in the final distillate product, removing the remaining vapors and passing them first in indirect heat exchange with a distillate stock, to partially condense said vapors and heat said distillate stock, then in indirect heat exchange with another cooling medium to cause the final desired degree of condensation of the vapors, whereby substantially all of the constituents thereof desired in the final product are condensed, with some undesired constituents, collecting resulting condensate and removing incondensible gases therefrom, passing condensate so obtained in indirect heat exchange with said hot vapors, as said distillate stock, whereby said hot vapors are initially cooled and said condensate is heated, introducing resulting heated condensate into an intermediate point in a stabilizing column under substantially super-atmospheric pressure wherein substantially all of the remaining undesired excessively volatile constituents are separated as vapors from said desired constituents as liquids, removing said undesired excessively volatile constituents from the top of said column, withdrawing the stabilized product from the base of said column and applying additional heat from an external source to the base of said column.

JOSEPH K. ROBERTS.
GEORGE W. WATTS.